United States Patent [19]

Mort

[11] 3,915,024
[45] Oct. 28, 1975

[54] DRIVE ARRANGEMENTS

[75] Inventor: William Stuart Mort, Longton, England

[73] Assignee: British Leyland Truck & Bus Division Ltd., Leyland, England

[22] Filed: July 21, 1971

[21] Appl. No.: 164,742

[30] Foreign Application Priority Data
July 28, 1970 United Kingdom............... 36550/70

[52] U.S. Cl. .......... 74/242.8; 74/242.12; 123/41.49; 123/195 A; 180/68
[51] Int. Cl.²............................................ F16H 7/08
[58] Field of Search......... 74/242.8, 242.12, 242.13; 123/41.49, 41.63, 41.65, 95, 195 A; 416/150; 180/68, 54

[56] References Cited
UNITED STATES PATENTS

| | | | |
|---|---|---|---|
| 891,697 | 6/1908 | Huff................................ | 123/41.49 |
| 1,301,784 | 4/1919 | Calkins............................ | 123/41.49 |
| 1,598,274 | 8/1926 | Flagg............................... | 123/41.49 |
| 1,986,568 | 1/1935 | Fink................................. | 123/41.49 |
| 2,680,490 | 6/1954 | Dafoe.............................. | 180/68 |
| 2,708,373 | 5/1955 | Werner............................ | 74/242.8 |
| 2,722,132 | 11/1955 | Russell........................... | 74/242.13 R |
| 2,856,785 | 10/1958 | Steele............................. | 74/242.8 |
| 3,325,095 | 6/1967 | Mueller et al.................. | 74/242.8 |
| 3,362,243 | 1/1968 | Ferguson....................... | 123/195 A |

*Primary Examiner*—C. J. Husar
*Attorney, Agent, or Firm*—Thomas J. Greer, Jr.

[57] ABSTRACT

In a motor vehicle having a flexibly mounted engine, a rigidly mounted radiator and a direct drive between the engine and a radiator cooling fan, the cooling fan is carried on a mounting which allows it to move relatively to the engine but which is held at a fixed distance from the engine by a tie rod.

4 Claims, 2 Drawing Figures

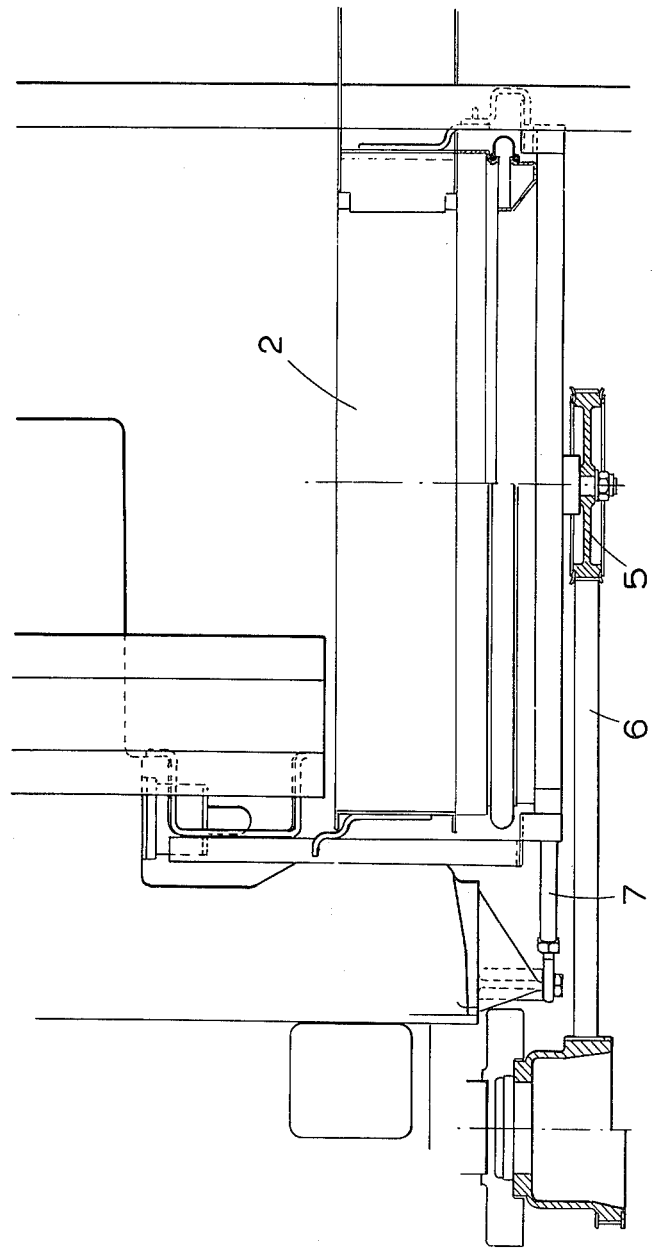

DRIVE ARRANGEMENTS

The present invention relates to drive arrangements and more particularly, though not exclusively, to drive arrangements for the cooling fan associated with a radiator incorporated in the cooling system of an internal combustion engine.

The present invention is generally applicable where it is required to drive a device from a motor indirectly and where the motor, when running, moves or tends to move a limited amount relatively to the device. The term "motor" is intended to include an engine.

According to the present invention a device is drivably connected to a motor by a transmission element and is movable on a fixed mounting, the device and the motor being interconnected by a rigid member which fixes the distance between the device and the motor but which allows the device and motor to move relatively to the fixed mounting.

According to one feature of the invention the device is slidably mounted on the fixed mounting so that the device can move in a linear path.

According to a second feature of the invention the device is mounted on a flexible member or members carried by the fixed mounting which allow it to move relatively to the fixed mounting.

According to a third feature of the invention the rigid member comprises a tie rod.

According to a fourth feature of the invention the motor comprises an internal combustion engine and the device comprises a pulley connected to a cooling fan, the pulley being drivable by the engine through a fan belt.

According to a fifth feature of the invention the rod is adjustable in length in order to enable the fan belt tension to be adjusted.

How the invention may be carried out will now be described by way of example only, and with reference to the accompanying drawings in which:

FIG. 2 is a side view of the arrangement shown in FIG. 1.

Figure 1:
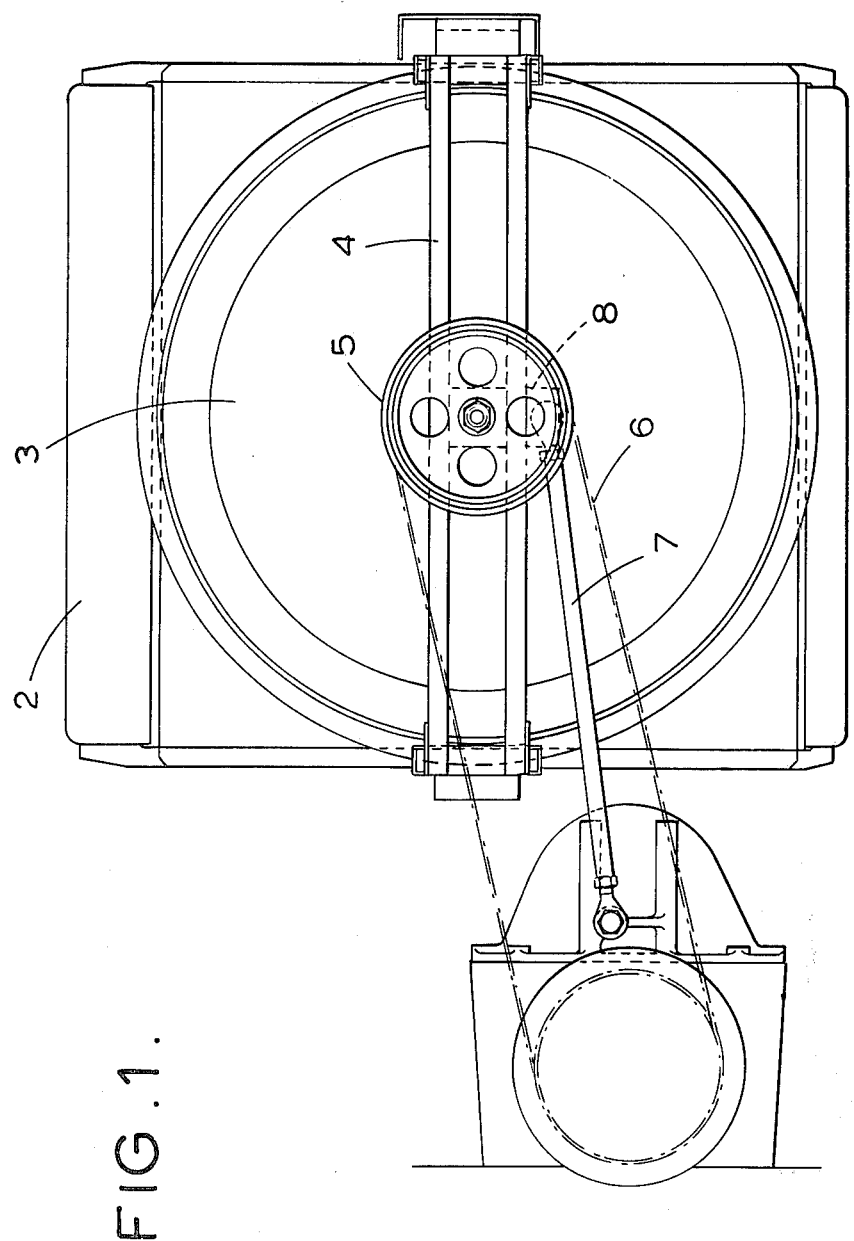
FIG. 1 is a front elevational view of one embodiment of the invention.

A bus has a rear mounted internal combustion engine 1 which is resiliently mounted on the vehicle body or chassis.

An engine cooling radiator 2 is rigidly mounted on the vehicle chassis or body and has a cooling fan 3 associated with it.

The cooling fan 3 is carried in a mounting 8 which is slidable along guides 4 in a linear path. The fan 3 has connected directly to it a driving pulley 5. The guides 4 are fixed in relation to the radiator 2.

The fan pulley 5 is drivable by a fan belt 6 from the engine 1.

A tie rod 7 interconnects the engine 1 and the fan mounting 8 so that the distance between the engine 1 and the fan 3 is fixed although both the engine 1, due to its resilient mountings, and the fan 3, due to the guides 4, can move relatively to the radiator 2. This movement is, of course, caused by the engine vibrating on its resilient mountings.

The ends of the tie rod 7 are adjustable to enable the effective overall length of the tie rod 7 to be altered and thus provide a means for varying the tension in the fan belt 6.

Clearly, other arrangements could be employed in place of the guides 4 to allow movement of the fan, and the tie rod 7 could be replaced with any other suitable rigid member in order to keep the engine/fan distance constant. For example, the device can be mounted on a flexible member or members carried by the fixed mounting which allow it to move relatively to the fixed mounting.

Furthermore, although the invention has been described in relation to the driving of an engine cooling fan it could also be employed to drive an air conditioning compressor from the engine.

I claim:

1. A cooling fan driving arrangement which comprises the following,
    a. an engine carried on a vehicle chassis or body,
    b. mounting means flexibly mounting the engine on the vehicle chassis or body,
    c. a coolant radiator and cooling fan assembly therefor,
    d. means connecting said cooling fan assembly to a fixed mounting, said means allowing limited free floating translational movement of said assembly with respect to said fixed mounting,
    e. a first pulley mounted on said engine and drivably connected thereto,
    f. a second pulley mounted on said fan assembly and drivably connected thereto,
    g. an endless flexible belt drivingly connecting the first pulley to the second pulley,
    h. a rigid member secured between the engine and the fan assembly to fix the distance between the axes of rotation of the two said driving pulleys, even when there is movement of the engine relative to the said fixed mounting, the length of said rigid member determining the tension in the endless flexible belt.

2. A cooling fan driving arrangement as claimed in claim 1 in which the means connecting the cooling fan assembly to the said fixed mounting comprises:
    a. guides carried by the said fixed mounting and fixed with respect to it,
    b. means carried by the said cooling fan assembly and slidably engaging said runners, whereby said fan assembly can move freely with respect to said guides and said fixed mounting.

3. A cooling fan driving arrangement as claimed in in claim 1 in which the means connecting the cooling fan assembly to the said fixed mounting comprises flexible carrier means secured between said fixed mounting and said fan assembly to connect the latter to the former, said flexible carrier means allowing limited movement of the fan assembly with respect to the said fixed mounting.

4. A cooling fan driving arrangement as claimed in claim 1 in which the said rigid member comprises a tie rod having means to enable the tie rod length to be adjusted.

* * * * *